US012420391B2

(12) United States Patent
Doyle et al.

(10) Patent No.: US 12,420,391 B2
(45) Date of Patent: Sep. 23, 2025

(54) HOSE CLAMP PLIERS

(71) Applicant: Snap-on Incorporated, Kenosha, WI (US)

(72) Inventors: David T. Doyle, Pleasant Prairie, WI (US); George R. R. Call, Kenosha, WI (US); Nicholas A. Gabbey, Mount Pleasant, WI (US)

(73) Assignee: Snap-on Incorporated, Kenosha, WI (US)

( * ) Notice: Subject to any disclaimer, the term of this patent is extended or adjusted under 35 U.S.C. 154(b) by 29 days.

(21) Appl. No.: 18/217,519

(22) Filed: Jun. 30, 2023

(65) Prior Publication Data

US 2025/0001565 A1 Jan. 2, 2025

(51) Int. Cl.
*B25B 25/00* (2006.01)

(52) U.S. Cl.
CPC .................................. *B25B 25/005* (2013.01)

(58) Field of Classification Search
CPC .......... B25B 25/005; B25B 7/02; B25B 7/04; B25B 7/00; B25B 7/22; B25B 7/20; B25B 7/18; B25B 7/10; B25B 5/04; B25B 5/14; B25B 27/20; B25B 27/146; B25B 27/30; B25B 27/10; Y10T 24/1484; Y10T 1429/53783; Y10T 1429/5363
USPC ....... 81/9.3, 486, 485, 487, 418, 314, 424.5; 29/225, 243.56, 426.6
See application file for complete search history.

(56) References Cited

U.S. PATENT DOCUMENTS

| | | | |
|---|---|---|---|
| 2,677,982 | A | 5/1954 | Arras et al. |
| 2,898,789 | A | 8/1959 | Meese |
| 5,865,072 | A | 2/1999 | Jerdee |
| 6,098,508 | A | 8/2000 | Battistone |
| 6,128,975 | A | 10/2000 | Schley et al. |
| 6,336,386 | B1 | 1/2002 | Lee |
| 6,634,258 | B2 | 10/2003 | Pool et al. |

(Continued)

FOREIGN PATENT DOCUMENTS

| | | |
|---|---|---|
| AU | 2019257518 | 5/2020 |
| CN | 102365152 A | 2/2012 |

(Continued)

OTHER PUBLICATIONS

Machine translation of JP-H0717465-U (Year: 1995).*

(Continued)

*Primary Examiner* — Robert F Neibaur
(74) *Attorney, Agent, or Firm* — McDonnell Boehnen Hulbert & Berghoff LLP

(57) ABSTRACT

Hose clamp pliers include a first plier half, a second plier half, and a pivot member. An inner face of the first jaw portion includes a first longitudinal groove and a second longitudinal groove. Each of the first and second longitudinal grooves include a first section extending from a front end of the first jaw portion and a second section extending at an angle from the first section in a direction away from the second jaw portion. An inner face of the second jaw portion includes a third longitudinal groove and a fourth longitudinal groove. Each of the third and fourth longitudinal grooves include a first section extending from a front end of the second jaw portion and a second section extending at an angle from the first section in a direction away from the first jaw portion.

19 Claims, 6 Drawing Sheets

FIG. 3

(56) References Cited

U.S. PATENT DOCUMENTS

| | | | | |
|---|---|---|---|---|
| 6,923,097 | B2 * | 8/2005 | Takasaki | B25B 7/02 81/418 |
| 7,313,984 | B1 | 1/2008 | Eggert et al. | |
| 7,481,019 | B2 * | 1/2009 | Rosenberg | A01K 83/06 43/44.4 |
| 8,302,283 | B2 | 11/2012 | Bobenhausen | |
| 8,656,812 | B2 * | 2/2014 | Kawai | B25B 7/02 81/418 |
| 8,707,538 | B2 | 4/2014 | Bobenhausen | |
| 9,180,576 | B2 | 11/2015 | Wu | |
| 10,016,882 | B1 | 7/2018 | Lai | |
| 10,960,519 | B2 | 3/2021 | Wu | |
| 11,267,111 | B2 | 3/2022 | Irving | |
| 2008/0163729 | A1 | 7/2008 | Stevens | |
| 2009/0064823 | A1 | 3/2009 | Huang | |
| 2010/0058895 | A1 | 3/2010 | Wu | |
| 2010/0107823 | A1 | 5/2010 | Wu | |
| 2012/0297603 | A1 | 11/2012 | Harrison | |
| 2014/0290447 | A1 | 10/2014 | Knipex-Werk | |
| 2018/0333832 | A1 | 11/2018 | Liu | |
| 2019/0184531 | A1 | 6/2019 | Wang | |
| 2020/0139515 | A1 | 5/2020 | Kuter-Arnbeck et al. | |

FOREIGN PATENT DOCUMENTS

| | | | | |
|---|---|---|---|---|
| CN | 115122248 | A | 9/2022 | |
| DE | 202009002066 | U1 | 7/2009 | |
| EP | 2436488 | B1 | 12/2016 | |
| GB | 2607164 | A | 11/2022 | |
| JP | H0717465 | U * | 3/1995 | B25B 25/005 |
| TW | M545672 | U | 7/2017 | |
| TW | 1628052 | B | 7/2018 | |
| TW | 1734561 | B | 7/2021 | |
| TW | M629466 | U | 7/2022 | |

OTHER PUBLICATIONS

Vampliers VT-001-8. 8" PRO Linesman Pliers, Screw Extraction Pliers to Remove Rusted/Damage/Speciality Screw nuts and Bolts (PRO)retrieved at https://www.amazon.com/VAMPLIERS-Linemans-Extraction-Specialty-Extractions/dp/B00LMOAYR2/ref=asc_df_B00LMOAYR2/?tag=hyprod-20&linkCode=df0&hvadid=198077680239&hvpos=&hvnetw=g&hvrand=4310378354180061700&hvpone=&hvptwo=&hvqmt=&hvdev=c&hvdvcmdl=&hvlocint=&hvlocphy=9021465&hvtargid=pla-383525757080&th=1 on Apr. 17, 2023.

Dieter Schmid Fine Tools, "Combination Pliers", Retrieved at https://www.fine-tools.com/kombizange.html on Apr. 17, 2023.

Powerbuilt, "Powerbuilt Multi-Directional Hose Clamp Pliers", Retrieved at https://www.amazon.com/Powerbuilt-Multi-Directional-Hose-Clamp-Pliers/dp/B09QM9V786 on Apr. 17, 2023.

Lisle, "Lisle 17460 Curved Hose Clamp Pliers", Retrieved at https://www.amazon.com/Lisle-17460-Curved-Clamp-Pliers/dp/B08V8FX6Q6?source=ps-sl-shoppingads-lpcontext&ref_fplfs&smid=ATVPDKIKX0DER&th=1 on Apr. 17, 2023.

International Search Report and Written Opinion prepared by the US Patent Office in international application No. PCT/US2024/036272, dated Sep. 23, 2024.

* cited by examiner

HOSE CLAMP PLIERS

BACKGROUND

Hose clamp pliers are a tool formed by two halves with handles at one end and jaws configured to hold a hose clamp at the other end. The hose clamp pliers can be used to grip hose clamps or other work pieces.

OVERVIEW

In an embodiment, hose clamp pliers are disclosed. The hose clamp pliers include a first plier half including a first jaw portion and a first handle, a second plier half including a second jaw portion and a second handle, and a pivot member pivotally coupling the first plier half and the second plier half such that when the pliers are in a closed position the first jaw portion is adjacent to the second jaw portion and the pliers define a longitudinal axis that extends from the first and second jaw portions to the first and second handles. An inner face of the first jaw portion includes a first longitudinal groove and a second longitudinal groove. Each of the first and second longitudinal grooves include a first section extending from a front end of the first jaw portion and a second section extending at an angle from the first section in a direction away from the second jaw portion. An inner face of the second jaw portion includes a third longitudinal groove and a fourth longitudinal groove. Each of the third and fourth longitudinal grooves include a first section extending from a front end of the second jaw portion and a second section extending at an angle from the first section in a direction away from the first jaw portion.

In an embodiment of the hose clamp pliers, the first section of each longitudinal groove is straight.

In an embodiment of the hose clamp pliers, the second section of each longitudinal groove is straight.

In an embodiment of the hose clamp pliers, the angle between the first section and second section of each longitudinal groove is in a range of 20 to 40 degrees.

In an embodiment of the hose clamp pliers, the angle between the first section and second section of each groove is about 30 degrees.

In an embodiment of the hose clamp pliers, the first longitudinal groove and second longitudinal groove have the same shape.

In an embodiment of the hose clamp pliers, the first longitudinal groove is a mirror image of the third longitudinal groove.

In an embodiment of the hose clamp pliers, the third longitudinal groove and fourth longitudinal groove have the same shape.

In an embodiment of the hose clamp pliers, the first and second longitudinal grooves include a third section extending from the second section and having a circular configuration that curves toward the second jaw portion of the second plier half.

In an embodiment of the hose clamp pliers, the third and fourth longitudinal grooves include a third section extending from the second section and having a circular configuration that curves toward the first jaw portion of the first plier half.

In an embodiment of the hose clamp pliers, the longitudinal axis includes a jaw end and a handle end, and the second section of each groove is angled toward the handle end of handle of the longitudinal axis such that the second section is oriented to engage hose clamp tabs at an inward angle throughout the opening range of the pliers.

In an embodiment of the hose clamp pliers, the first section of the first longitudinal groove and is parallel to the first section of the third longitudinal groove when the pliers are in the closed position and the inner faces of the first and second jaw portions abut.

In an embodiment of the hose clamp pliers, the inner face of the first jaw portion includes a first transverse groove that intersects the first and second longitudinal grooves, and the inner face of the second jaw portion includes a second transverse groove that intersects the third and fourth longitudinal grooves.

In an embodiment of the hose clamp pliers, the first transverse groove is perpendicular to the first longitudinal groove.

In an embodiment of the hose clamp pliers, a depth of the first longitudinal groove is the same as a depth of the first transverse groove.

In an embodiment of the hose clamp pliers, the second plier half includes a channel, and wherein a position of the pivot member is adjustable in the channel of the second plier half.

In another embodiment, a method of opening a hose clamp is disclosed. The method includes opening hose clamp pliers. The hose clamp pliers include a first plier half including a first jaw portion and a first handle, a second plier half including a second jaw portion and a second handle, and a pivot member pivotally coupling the first plier half and the second plier half such that when the pliers are in a closed position the first jaw portion is adjacent to the second jaw portion and the pliers define a longitudinal axis that extends from the first and second jaw portions to the first and second handles. An inner face of the first jaw portion includes a first longitudinal groove and a second longitudinal groove. Each of the first and second longitudinal grooves include a first section extending from a front end of the first jaw portion and a second section extending at an angle from the first section in a direction away from the second jaw portion. An inner face of the second jaw portion includes a third longitudinal groove and a fourth longitudinal groove. Each of the third and fourth longitudinal grooves include a first section extending from a front end of the second jaw portion and a second section extending at an angle from the first section in a direction away from the first jaw portion. The method includes positioning a first tab of the hose clamp in the second section of the first longitudinal groove and positioning a second tab of the hose clamp in the second section of one of the third longitudinal groove or fourth longitudinal groove. The method also includes moving the hose clamp pliers toward the closed position so as to open the hose clamp.

In an embodiment of the method, the longitudinal axis includes a jaw end and a handle end, and wherein the second section of the first groove is angled toward the handle end of the longitudinal axis throughout the movement of the hose clamp pliers toward the closed position such that the second section of the first groove engages the first tab at an inward angle throughout the movement of the hose clamp pliers toward the closed position.

In an embodiment of the method, the first and second tabs of the hose clamp are offset and the second tab of the hose clamp is positioned in the fourth longitudinal groove.

In an embodiment of the method, the first and second tabs of the hose clamp are aligned, and the second tab of the hose clamp is positioned in the third longitudinal groove.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

I. Introduction

Figure 1:
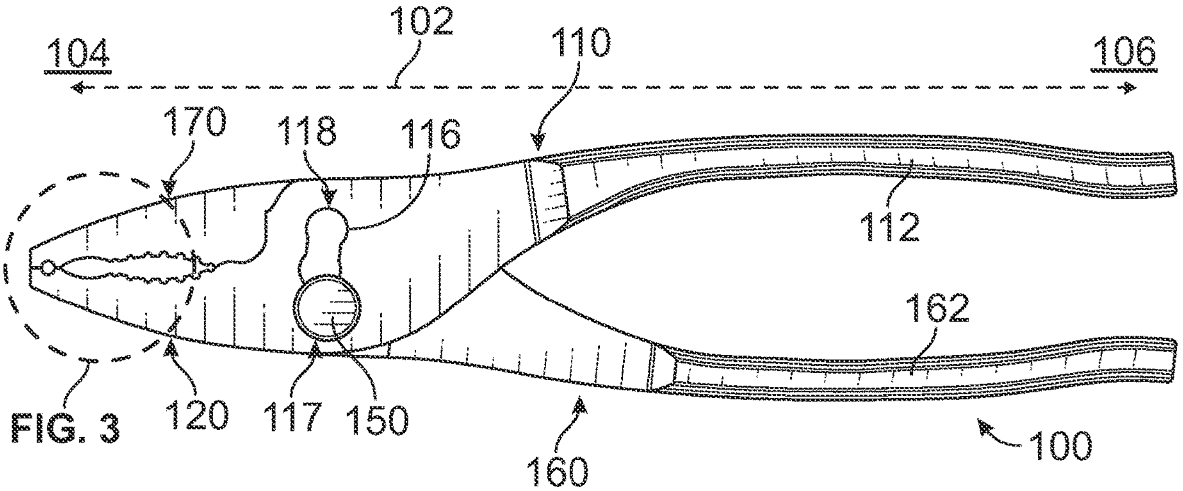
FIG. 1 shows a side view of hose clamp pliers in a closed position in accordance with an example embodiment.

This description describes several example embodiments, at least some of which pertain to pliers, such as hose clamp pliers that are configured for removing or installing hose clamps. Hose clamps are used to secure and seal hoses onto connections or fittings. Typically, the hose is placed over the connection and the hose clamp, which has a ring-shaped configuration, is positioned to surround the hose and secure the hose to the connection. The hose clamp provides pressure on the hose to hold the hose in place and to form a seal between the hose and the connection. While traditional clamps may loosen over time or with changes in temperature, some hose clamps are designed to maintain tension on the hose irrespective of changes in other factors, such as changes in temperature. Such hose clamps may be referred to as constant tension hose clamps.

Spring tension hose clamps are a type of constant tension hose clamp that are employed for various applications, such as automotive systems, including cooling systems. A spring tension hose clamp may be formed of a metal band or wire, for example, which is formed in a ring with ends that pass one another. Tabs are often included on the ends and configured to allow the hose clamp to be opened. For example, by pressing the tabs together, the diameter of the ring expands, thereby allowing the clamp to be placed over a hose. Once the tabs are released, the elastic properties of the material will cause the clamp to contract to a smaller diameter, thereby placing a clamping force on the hose, in the manner of a spring. In other words, the spring force within the hose clamp maintains the smaller diameter of the hose clamp, while the application of an exterior force allows the hose clamp to expand.

Various tools can be used for expanding a hose clamp. Hose clamps pliers are particularly useful in many scenarios where hose clamps need to be removed or installed. The operation of hose clamp pliers is typically familiar to users, as the general operation is similar to all pliers, where the jaws of the pliers are opened and shut by rotating opposing halves of the pliers using their respective handles. Accordingly, hose clamp pliers typically do not require significant training or practice to use. Further, in some embodiments, the hose clamp pliers may also be versatile in their use and capable of gripping a broad range of objects other than hose clamps. This versatility also makes hose clamp pliers an attractive option to have available. Further, hose clamp pliers can be held and positioned to fit into a wide range of spaces where hose clamps may be employed. The pliers may also be configured to engage the hose clamp from various angles, further increasing the versatility of this tool. Embodiments of the hose clamp pliers described herein, in particular, can be used to engage and expand a variety of types of hose clamps from various different angles or positions while maintaining engagement with the hose clamp.

II. Exemplary Hose Clamp Pliers

Figure 2A:
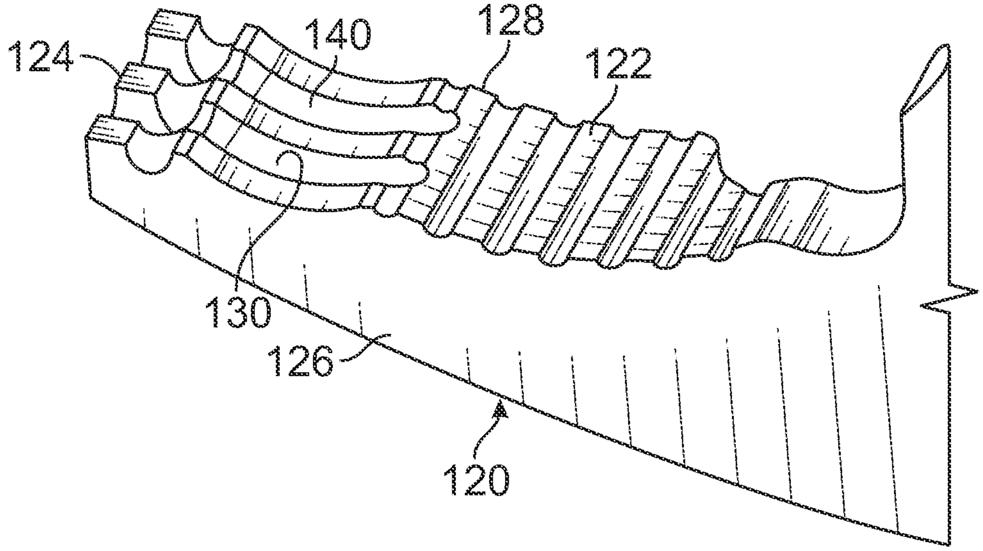
FIG. 2A shows an enlarged perspective view of a jaw portion of one plier half of the hose clamp pliers of FIG. 1.
Figure 2B:
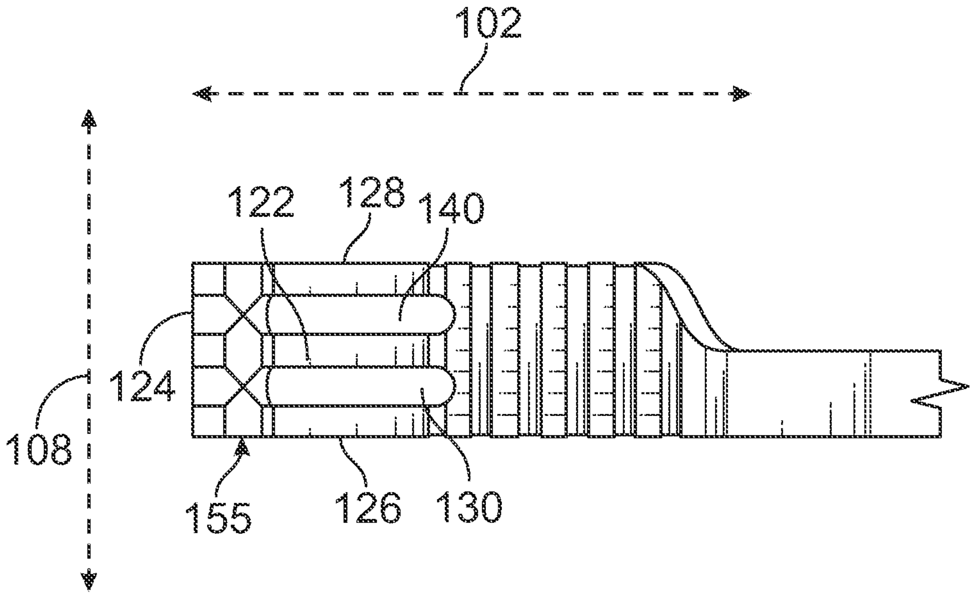
FIG. 2B shows an enlarged top view of the jaw portion of FIG. 2A.
Figure 3:
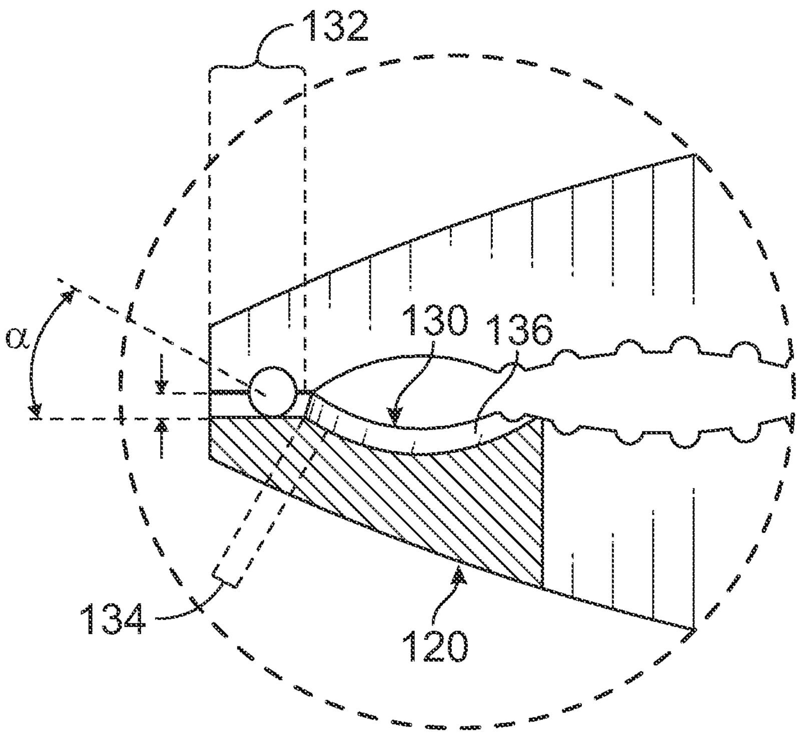
FIG. 3 shows an enlarged side view of a portion of the hose clamp pliers of FIG. 1 with a section removed to reveal a longitudinal groove in a jaw portion of the hose clamp pliers.

FIGS. 1-3 show an embodiment of hose clamp pliers 100. A shown in FIG. 1, the hose clamp pliers 100 may include a first plier half 110 and a second plier half 160 that are coupled to on another by a pivot member 150. The first plier half 110 may include a first handle 112 at one end and a first jaw portion 120 at the opposing end. Likewise, the second plier half 160 may include a second handle 162 at one end and a second jaw portion 170 at the other end. When the hose clamp pliers 100 are in a closed position the first jaw portion 120 is adjacent to the second jaw portion 170. To open the hose clamp pliers 100 so as to move the first jaw portion 120 and second jaw portion 170 apart, the first handle 112 may be moved away from the second handle 162.

While the hose clamp pliers 100 may be configured so that they can be opened to a wide gap between the first jaw portion 120 and second jaw portion 170, they may be generally configured to have a handle end and a jaw end. In this regard, the hose clamp pliers 100 are described herein with respect to a longitudinal axis 102, as shown in FIG. 1, which extends from a jaw end 104 corresponding to the first jaw portion 120 and second jaw portion 170 and a handle end 106 corresponding to a first handle 112 and a second handle 162. The longitudinal axis 102, as described herein, is not fixed with regard to either of the two plier halves 110, 160, and instead is neutral with respect to the plier halves 110, 160, such that opening the hose clamp pliers 100 causes respective opposing rotations of the pliers halves 110, 160 of equal magnitude. In other words, it should be understood that an opening of the hose clamp pliers 100 by 20 degrees may be considered as a 10 degree rotation by the first plier half 110 in one rotational direction with respect to the longitudinal axis 102 and a 10 degree rotation of the second plier half 160 in the opposite rotational direction with respect to the longitudinal axis 102.

Opening and closing of the hose clamp pliers 100 may be accomplished by rotation of the first plier half 110 and second plier half 160 about the pivot member 150. In some embodiments, the pivot member 150 may be a separate element, such as a shaft, that is inserted through each of the first plier half 110 and the second plier half 160. For example, the pivot member 150 may be rotatable with respect to each of the first plier half 110 and the second plier half 160 such that neither plier half is rotationally constrained with respect to the pivot member 150. Alternatively, in some embodiments, the pivot member 150 may be fixed with respect to one of the plier halves. For example, in some embodiments, the pivot member 150 may be integrally formed with the first plier half 110 or the second plier half 160.

In some embodiments, the pivot member 150 may be adjustable with respect to one of the plier halves. For example, in the illustrated embodiment, the pivot member 150 has a fixed position (but is freely rotatable) with respect to the second plier half 160 but is held in a channel 116 in the first plier half 110. For example, the width of the pivot member 150 may be sized to fit within the channel 116 and allow the pivot member 150 to move along the length of the channel 116. To retain the pivot member 150 in the channel 116, the pivot member 150 may include a head that is larger than the width of the channel 116 so that the pivot member 150 cannot be removed from the channel 116 and the hose clamp pliers 100 are held together.

The use of the channel 116 allows the hose clamp pliers 100 to adjust between a narrow configuration and a wide configuration, in the manner of slip joint pliers. In the illustrated embodiment, when the pivot member 150 is at a first end 117 of the channel 116, as shown, the hose clamp pliers 100 are in the narrow configuration. In this configuration, the first plier half 110 and the second plier half 160 are held close to one another, such that the first jaw portion 120 abuts the second jaw portion 170 when the hose clamp pliers 100 are closed, as shown. When the pivot member 150 moves to the second end 118 of the channel 116, the hose clamp pliers 100 are placed in the wide configuration. In this configuration, the first jaw portion 120 can be further separated from the second jaw portion 170 in order to form a wider opening for engaging larger hose clamps or gripping larger items.

FIGS. 2A and 2B show an inner face 122 of the first jaw portion 120 which illustrates longitudinal grooves 130 and 140 that extend in the direction of the longitudinal axis 102. Details of the first longitudinal groove 130 and second longitudinal groove 140 are described herein with respect to FIGS. 2A, 2B and 3. The second jaw portion 170 may also include longitudinal grooves in the respective inner face of the second jaw portion 170. In some embodiments, the longitudinal grooves in the second jaw portion 170 may have a similar configuration as the first longitudinal groove 130 and second longitudinal groove 140 of the first jaw portion 120. As an example, longitudinal grooves in the second jaw portion can be seen in FIGS. 4-6C.

The longitudinal grooves described herein are referred to herein as "longitudinal" in that they are substantially aligned with the longitudinal axis 102 of the hose clamp pliers 100, rather than a transverse axis 108, as shown in FIG. 2B, which extends across the width of the plier halves. As described in more detail below, the longitudinal grooves of the disclosure include a profile that varies in the depth direction over several sections that run along the longitudinal axis. However, in some embodiments, the projection of the longitudinal grooves from a top view, i.e., with respect to the plane defined by the longitudinal axis 102 and transverse axis 108, is straight. For example, from the top-view perspective of FIG. 2B, the illustrated first longitudinal groove 130 and second longitudinal groove 140 are straight. In other embodiments, however, the longitudinal grooves may not follow a straight path with respect to the top view. For example, in some embodiments, each of the longitudinal grooves may include one or more sections that are angled from the longitudinal axis so that the respective longitudinal groove also partially extends in the transverse direction.

In some embodiments, the width of each longitudinal groove may be consistent over the length of the longitudinal groove. For example, in the illustrated embodiment, as shown in FIG. 2B, the first longitudinal groove 130 and the second longitudinal groove 140 each have a consistent width from the front end 124 of the first jaw portion 120 to the inner end of the respective groove. In other embodiments, the width of the longitudinal grooves may vary over the length of the jaw portion. For example, in some embodiments, one or more sections of the longitudinal groove may be wider than another. Further, in some embodiments the longitudinal grooves may taper from a greater width at the front end of the jaw portion, to a narrow width where the groove ends, for example.

Similarly, in some embodiments, the depth of each longitudinal groove may be consistent over the length of the longitudinal groove. For example, in some embodiments, the depth of each groove is consistent from the front end of the respective jaw portion to the point at which the longitudinal groove ends. In other embodiments, for example, the depth of the longitudinal grooves may taper, such as from a greater depth at the front end of the jaw portion to a shallow depth where the groove ends.

The longitudinal grooves may be spaced apart across the width of the respective jaw portion. For example, as shown in FIGS. 2A and 2B, the first longitudinal groove 130 and second longitudinal groove 140 are separated by a section of the inner face 122 of the first jaw portion 120. This spacing between the longitudinal grooves 130, 140 may be set to accommodate hose clamps of particular designs, as described below. A similar section of the inner face 122 of the first jaw portion 120 may also be provided in the space between the longitudinal groove and the neighboring lateral side of the first jaw portion 120. For example, a section of the inner face 122 is provided between the first longitudinal groove 130 and the first lateral side 126 of the first jaw portion 120. Likewise, another section of the inner face 122 is provided between the second longitudinal groove 140 and the second lateral side 128 of the first jaw portion 120. Further, in some embodiments, the distance between the first longitudinal groove 130 and the first lateral side 126 of the first jaw portion 120 is the same as the distance between the second longitudinal groove 140 and the second lateral side 128 of the first jaw portion 120.

The inner face of the jaw portions may be smooth or may include a texture. For example, the inner face may include ridges or a knurled texture to aid in gripping surfaces.

While the illustrated embodiment shows jaw portions with only two longitudinal grooves, in other embodiments, one or both of the jaw portions may include additional grooves. For example, in some embodiments, the first jaw portion may have one or more additional longitudinal grooves between the first longitudinal groove and the second longitudinal groove. Similarly, in some embodiments, the second jaw portion may also include additional longitudinal grooves between the third longitudinal groove and the fourth longitudinal groove. Moreover, the number of longitudinal grooves in the first jaw portion may be the same or different from the number of longitudinal grooves in the second jaw portion.

FIG. 3. illustrates several sections of the first longitudinal groove 130 in the first jaw portion 120. A portion of the first jaw portion 120 along the first lateral side 126 (FIG. 2B) is removed so that the first longitudinal groove 130 is visible. In the embodiment illustrated in FIGS. 1 through 3, the second longitudinal groove 140 has the same configuration as the first longitudinal groove 130, while third and fourth longitudinal grooves in the second jaw portion 170 have a mirror image configuration. As shown in FIG. 3, the first longitudinal groove 130 includes a first section 132 extending from the front end 124 of the first jaw portion 120 to a second section 134. The second section 134 extends from the first section 132 at an angle α, such that the second section 134 of the longitudinal groove 130 extends away from the second jaw portion 170.

The angled direction of the second section 134 of the longitudinal groove 130 allows the hose clamp pliers 100 to maintain a positive engagement with a hose clamp tab throughout the range of operation of the hose clamp pliers 100 in opening a hose clamp. The term positive engagement refers to contact that exerts a force in a direction toward the interior of the jaws of the hose clamp pliers 100. Positive engagement by the hose clamp pliers 100 may be achieved because the second section 134 of the longitudinal groove 130 is angled inward throughout the opening range of the hose clamp pliers. Comparatively, because the first section 132 of the first longitudinal groove 130 is parallel to the longitudinal axis 102 when the hose clamp pliers 100 are closed, as soon as the hose clamp pliers 100 begin to open from the position shown in FIG. 3, the first section 132 will rotate counter clockwise. As a result, the contact surface of the first section 132 will face outwardly from the interior of the jaws (right side of the image) as soon as the jaws begin to open. However, because the second section 134 of the longitudinal groove 130 is angled away from the opposing jaw portion, the second portion 134 will not be parallel with the longitudinal axis until the hose clamp pliers 100 are opened very wide. Thus, the second portion 134 can maintain an inward angle throughout a large opening range of the pliers.

In some embodiments of the hose clamp pliers, the first section of each longitudinal groove may be straight. For example, as shown in FIG. 3, the first section 132 of the first longitudinal groove 130 extends inward from the front end 124 of the first jaw portion 120 in a straight line that is parallel to the longitudinal axis 102 of the hose clamp pliers 100 when the hose clamp pliers are in a closed position.

Further, in some embodiments, the second section of each longitudinal groove may be straight. For example, as shown in FIG. 3, the first longitudinal groove 130 includes a straight second section 134 that extends from the first section 132 at an angle α. In other embodiments, the second section may be curved, but the initial trajectory of the second section may be angled with respect to the first section of the longitudinal groove.

In some embodiments, the angle between the first section and second section of each longitudinal groove may be in a range of 20 to 40 degrees. For example, in some embodiments, the angle between the first section and second section of each groove may be about 30 degrees. The term about 30 degrees, as described herein, is 30 degrees+/−2 degrees. In other embodiments, the angle between the first section and second section of each groove may be in a range of 29 to 31 degrees. In some embodiments the angle between the first section and the second section in each of the longitudinal grooves is the same. In other embodiments, the angles may be different. For example, in some embodiments, the first and third longitudinal grooves may have first and second sections that are angled by a first amount while the second and fourth longitudinal grooves may have first and second sections that are angled by a different amount.

In some embodiments of the hose clamp pliers, the first longitudinal groove 130 and the second longitudinal groove 140 have the same shape. In other words, in some embodiments, the first longitudinal groove 130 and the second longitudinal groove 140 are identical. Further, in some embodiments, the third longitudinal groove and the fourth longitudinal groove may be mirror images of the first and second longitudinal grooves. In other embodiments, the longitudinal grooves may have different shapes.

In some embodiments, the longitudinal grooves may include a third section extending from the second section and having a circular configuration that curves toward the second jaw portion of the second plier half. For example, in the illustrated embodiment of FIG. 3, the first longitudinal groove 130 includes a third section 136 that has a circular configuration that extends in a smooth transition from the second section 134 and curves back toward the second jaw portion 170.

In some embodiments, the inner face of the first jaw portion may include a transverse groove that intersects the first and second longitudinal grooves. For example, as shown in FIGS. 2A and 2B, the illustrated first jaw portion 120 includes a transverse groove 155 that extends from the first lateral side 124 to the second lateral side 126 of the first jaw portion 120. The transverse groove 155 intersects the first longitudinal groove 130 and the second longitudinal groove 140 as it extends across the first jaw portion 120. The second jaw portion may include a similar transverse groove that intersects the third and fourth longitudinal grooves.

The transverse grooves may be beneficial in providing flexibility for using the hose clamp pliers to remove or install a hose clamp. For example, the hose clamp pliers may initially be used to engage the tabs of a hose clamp with the longitudinal grooves but then be reoriented to engage the hose clamp with the transverse grooves for further adjustment. Alternatively, the transverse grooves may be used first and the longitudinal grooves second, for example.

In some embodiments the first transverse groove may be perpendicular to the first longitudinal groove. For example, as shown in FIG. 2B, in the illustrated embodiment, the transverse groove 155 is parallel to the transverse axis 108 and perpendicular to the longitudinal grooves 130, 140 and the longitudinal axis 102. Further, in some embodiments, the depth of the transverse groove is the same as the depth of the longitudinal groove. For example, the depth of the transverse 155 in the first jaw portion 120 may be the same as the depth of the first longitudinal groove 130.

Figure 4:
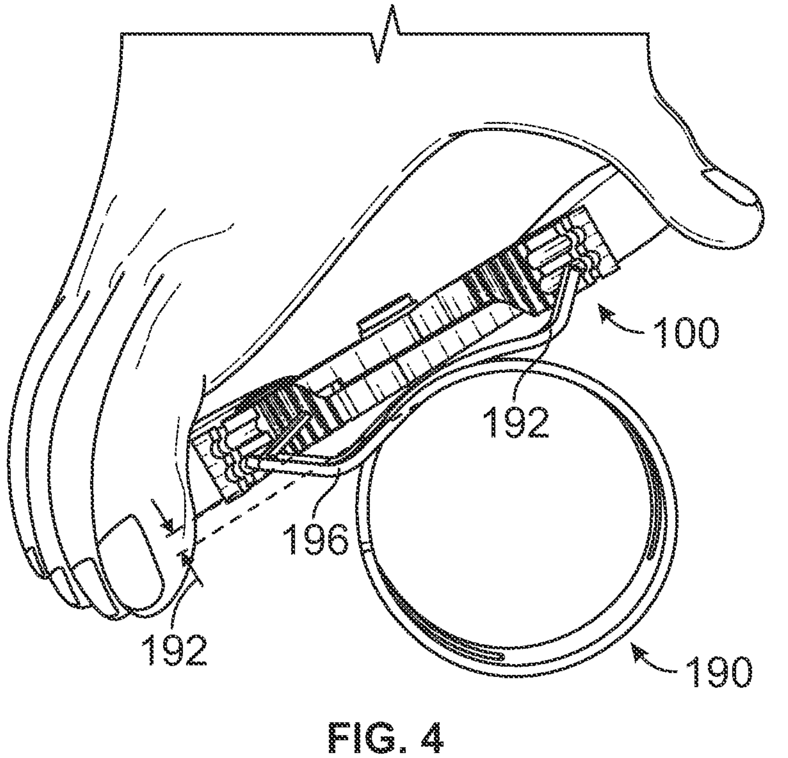
FIG. 4 shows a front view of hose clamp pliers in operation in accordance with an example embodiment.

The present disclosure also relates to a method of using hose clamp pliers. FIGS. 4 through 7 illustrate various details about the operation of hose clamp pliers in accordance with the disclosure. FIG. 4 shows hose clamp pliers 100 engaging the tabs 194, 196 of a constant tension hose clamp 190. As shown, the tabs are each disposed within aligned longitudinal grooves in the opposing jaw portions. In this configuration, the hose clamp pliers 100 are able to maintain a very close distance 192 between working edge of the hose clamp pliers 100 and the interior of the hose clamp 190, thereby applying force in a targeted direction to expand the hose clamp.

Figure 5A:
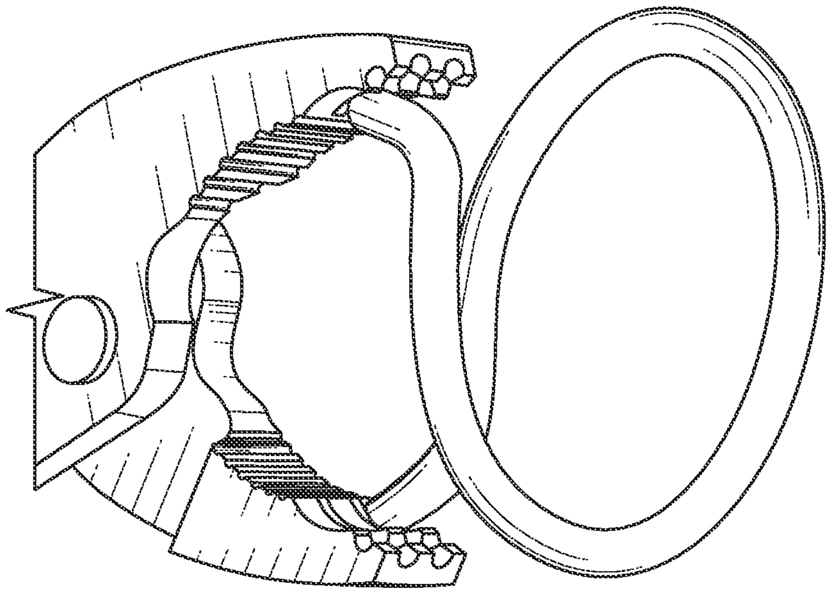
FIG. 5A shows a perspective view of hose clamp pliers in use in a first position in accordance with an example embodiment.
Figure 5B:
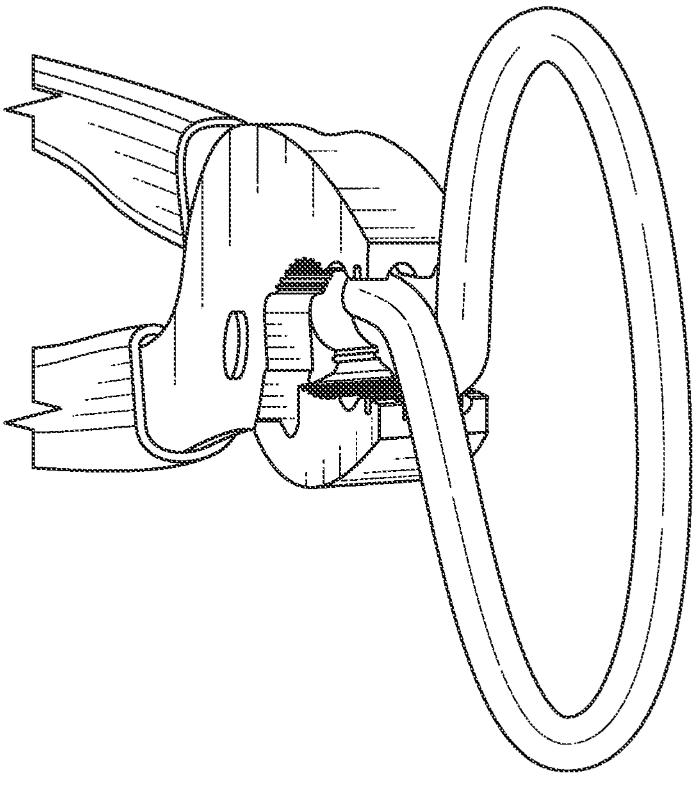
FIG. 5B shows a perspective view of the hose clamp pliers of FIG. 5A in use in a second position.

FIGS. 5A and 5B illustrate the expansion of a single wire style hose clamp. The design of this type of hose clamp places the two ends of the hose clamp in an offset relationship. Accordingly, to direct the force on the hose clamp appropriately so as to avoid twisting the hose clamp during expansion, the two ends of the wire hose clamp may be engaged in offset (rather than aligned) grooves of the hose clamp. Moreover, the ends of the wire engage in the second section of each of the longitudinal grooves, so that the force on the ends of the single wire hose clamp is directed inward toward the closed end of the pliers, which may increase reliability.

Figure 6A:
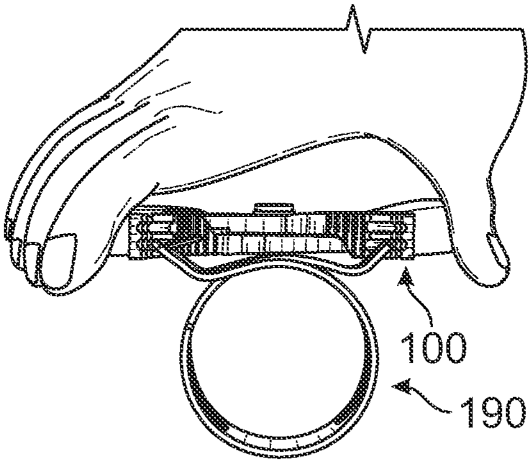
FIG. 6A shows an end view of hose clamp pliers in use in a first position in accordance with an example embodiment.
Figure 6B:
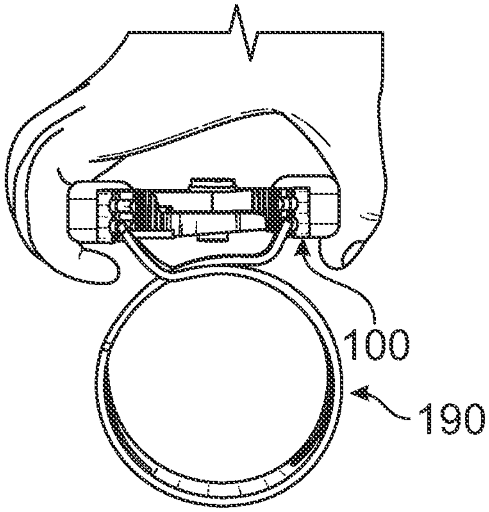
FIG. 6B shows an end view of the hose clamp pliers of FIG. 6A in use in a second position.
Figure 6C:
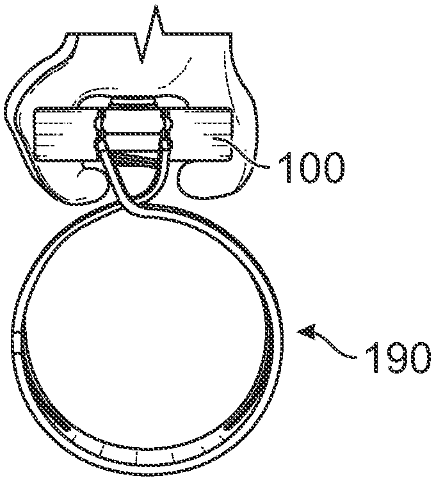
FIG. 6C shows an end view of the hose clamp pliers of FIG. 6A in use in a third position.

FIGS. 6A through 6C illustrate the expansion of a constant tension hose clamp 190 in the form of a metal band. As shown in FIG. 6A, the hose clamp pliers 100 are initially opened wide and the tabs of the hose clamp are placed into aligned longitudinal grooves of opposing jaw portions of the hose clamp pliers 100. FIG. 6B illustrates the hose clamp pliers partially closed with the hose clamp in a partially expanded position. In FIG. 6C, the hose clamp is fully expanded for installation on a hose, and the hose clamp is near its fully closed position.

Figure 7:
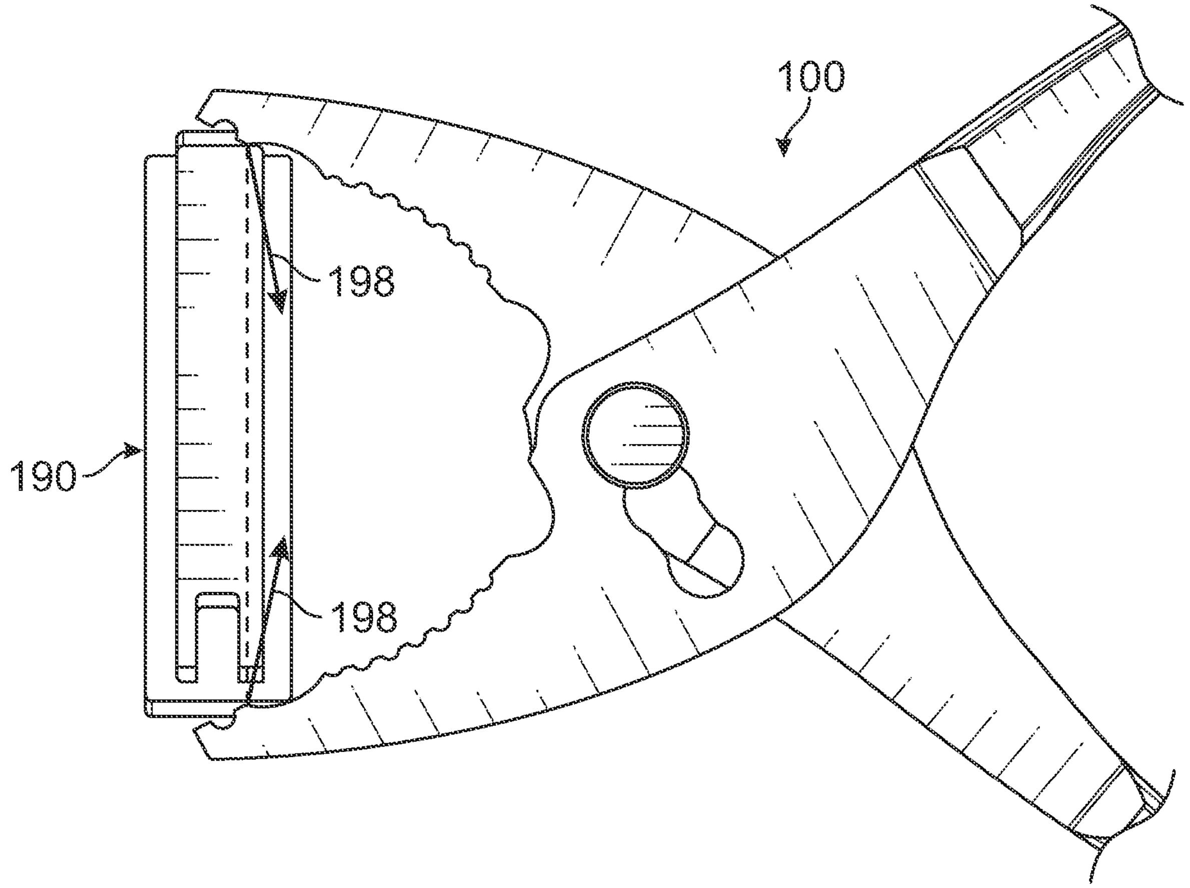
FIG. 7 shows a side view of hose clamp pliers in use in accordance with an example embodiment.

FIG. 7 illustrates the direction of force on the tabs of the hose clamp 100 when the tabs are positioned in the angled second section of the longitudinal grooves. As shown, despite the wide opening distance of the hose clamp pliers 100, the direction of force 198 provided by second section of the longitudinal grooves is angled inward toward the interior of the open jaws. This interior trajectory of the force reduces the likelihood of pushing the hose clamp outward and causing the hose clamp to disengage from the pliers.

IV. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. Hose clamp pliers comprising:

a first plier half including a first jaw portion and a first handle;

a second plier half including a second jaw portion and a second handle; and a pivot member pivotally coupling the first plier half and the second plier half such that when the hose clamp pliers are in a closed position the first jaw portion is adjacent to the second jaw portion and the hose clamp pliers define a longitudinal axis that extends from the first and second jaw portions to the first and second handles, wherein the first jaw portion includes a first inner face, a first longitudinal groove in the first inner face, and a second longitudinal groove in the first inner face, each of the first and second longitudinal grooves of the first jaw portion including a first front section extending from a front end of the first jaw portion and a first angled section extending at an angle from the first front section in a direction away from the second jaw portion, wherein the first and second longitudinal grooves of the first jaw portion are spaced apart and separated by a section of the first inner face of the first jaw portion; and wherein the second jaw portion includes a second inner face, a third longitudinal groove in the second inner face, and a fourth longitudinal groove in the second inner face, each of the third and fourth longitudinal grooves including a second front section extending from a front end of the second jaw portion and a second angled section extending at an angle from the second front section in a direction away from the first jaw portion, wherein when the hose clamp pliers are in the closed position the inner faces of the first and second jaw portions abut.

2. The hose clamp pliers of claim 1, wherein the front section of each longitudinal groove is straight.

3. The hose clamp pliers of claim 2, wherein the angled section of each longitudinal groove is straight.

4. The hose clamp pliers of claim 1, wherein the angle between the front section and angled section of each longitudinal groove is in a range of 20 to 40 degrees.

5. The hose clamp pliers of claim 4, wherein the angle between the front section and angled section of each groove is about 30 degrees.

6. The hose clamp pliers of claim 1, wherein the first longitudinal groove and second longitudinal groove have the same shape.

7. The hose clamp pliers of claim 1, wherein the third longitudinal groove is a mirror image of the first longitudinal groove.

8. The hose clamp pliers of claim 1, wherein the third longitudinal groove and fourth longitudinal groove have the same shape.

9. The hose clamp pliers of claim 1, wherein the first and second longitudinal grooves include a curved section extending from the first angled section and having a circular configuration that curves toward the second jaw portion of the second plier half.

10. The hose clamp pliers of claim 1, wherein the third and fourth longitudinal grooves include a curved section extending from the second angled section and having a circular configuration that curves toward the first jaw portion of the first plier half.

11. The hose clamp pliers of claim 1, wherein the longitudinal axis includes a jaw end and a handle end, and wherein the angled section of each groove is angled toward the handle end of the longitudinal axis throughout an opening range of the hose clamp pliers such that the angled section is oriented to engage hose clamp tabs at an inward angle throughout the opening range of the hose clamp pliers.

12. The hose clamp pliers of claim 1, wherein the first front section of the first longitudinal groove is parallel to the second front section of the third longitudinal groove when the hose clamp pliers are in the closed position.

13. The hose clamp pliers of claim 1, wherein the first jaw portion includes a first transverse groove in the first inner face that intersects the first and second longitudinal grooves, and the second jaw portion includes a second transverse groove in the second inner face that intersects the third and fourth longitudinal grooves.

14. The hose clamp pliers of claim 13, wherein the first transverse groove is perpendicular to the first longitudinal groove.

15. The hose clamp pliers of claim 13, wherein a depth of the first longitudinal groove is the same as a depth of the first transverse groove.

16. The hose clamp pliers of claim 1, wherein the first plier half includes a channel, and wherein a position of the pivot member is adjustable in the channel of the first plier half.

17. A method of opening a hose clamp, the method comprising:

opening hose clamp pliers, wherein the hose clamp pliers comprise:
  - a first plier half including a first jaw portion and a first handle;
  - a second plier half including a second jaw portion and a second handle; and
  - a pivot member pivotally coupling the first plier half and the second plier half such that when the hose clamp pliers are in a closed position the first jaw portion is adjacent to the second jaw portion and the hose clamp pliers define a longitudinal axis that extends from the first and second jaw portions to the first and second handles,
  - wherein the first jaw portion includes a first inner face, a first longitudinal groove in the first inner face, and a second longitudinal groove in the first inner face, each of the first and second longitudinal grooves of the first jaw portion including a first front section extending from a front end of the first jaw portion and a first angled section extending at an angle from the first front section in a direction away from the second jaw portion, and
  - wherein the second jaw portion includes a second inner face, a third longitudinal groove in the second inner face, and a fourth longitudinal groove in the second inner face, each of the third and fourth longitudinal grooves including a second front section extending from a front end of the second jaw portion and a second angled section extending at an angle from the second front section in a direction away from the first jaw portion;

positioning a first tab of the hose clamp in the first angled section of the first longitudinal groove;

positioning a second tab of the hose clamp in the second angled section of one of the third longitudinal groove or fourth longitudinal groove; and moving the hose clamp pliers toward the closed position so as to open the hose clamp, wherein the longitudinal axis includes a jaw end and a handle end, and wherein the first angled section of the first groove is angled toward the handle end of the longitudinal axis throughout the movement of the hose clamp pliers toward the closed position such that the first angled section of the first groove engages the first tab at an inward angle throughout the movement of the hose clamp pliers toward the closed position.

18. The method of claim 17, wherein the first and second tabs of the hose clamp are offset, and wherein the second tab of the hose clamp is positioned in the fourth longitudinal groove.

19. The method of claim 17, wherein the first and second tabs of the hose clamp are aligned, and wherein the second tab of the hose clamp is positioned in the third longitudinal groove.

* * * * *